United States Patent [19]

Mansfield

[11] Patent Number: 4,911,632
[45] Date of Patent: Mar. 27, 1990

[54] QUICK CHANGE HOLDER FOR MOLD INSERTS

[75] Inventor: James A. Mansfield, Yukon, Okla.

[73] Assignee: Dana Corporation, Toledo, Ohio

[21] Appl. No.: 282,381

[22] Filed: Dec. 9, 1988

[51] Int. Cl.⁴ .................... B29C 43/32; B29C 51/26
[52] U.S. Cl. ........................... 425/183; 72/472;
   72/481; 425/185; 425/186; 425/193; 425/451.9
[58] Field of Search ............... 425/183, 185, 193, 195,
   425/190, 451.9, 595, 186, DIG. 221; 72/466,
   462, 472, 481, 470

[56] References Cited

U.S. PATENT DOCUMENTS

| | | | |
|---|---|---|---|
| 2,074,048 | 3/1937 | Diescher | 72/481 |
| 3,075,416 | 1/1963 | Stuhldreher | 72/463 |
| 3,326,032 | 6/1967 | Stuhldreher | 72/463 |
| 3,359,781 | 12/1967 | Gilbert | 72/462 |
| 3,702,560 | 11/1972 | Weidel | 72/481 |
| 3,896,652 | 7/1975 | Groos et al. | 72/263 |
| 3,965,721 | 6/1976 | Roch | 72/462 |
| 4,151,736 | 5/1979 | Quaas | 72/462 |
| 4,408,522 | 10/1983 | Yamane | 100/295 |
| 4,457,684 | 7/1984 | Gram | 425/451.9 |
| 4,473,346 | 9/1984 | Hehl | 425/183 |
| 4,791,803 | 12/1988 | Broquet et al. | 72/481 |

FOREIGN PATENT DOCUMENTS

| | | | |
|---|---|---|---|
| 1552056 | 12/1969 | Fed. Rep. of Germany | 72/481 |
| 2461066 | 8/1975 | Fed. Rep. of Germany | 425/DIG. 221 |
| 516678 | 1/1940 | United Kingdom | 425/193 |

*Primary Examiner*—Jay H. Woo
*Assistant Examiner*—K. P. Nguyen
*Attorney, Agent, or Firm*—MacMillan, Sobanski & Todd

[57] ABSTRACT

A structure for releasably securing a plurality of mold inserts to a mold plate attached to a power press machine is disclosed. The mold plate has a plurality of apertures formed therethrough. Within each aperture, a plurality of inwardly extending spaced apart protrusions are formed. The mold inserts include end portions having a plurality of tabs formed thereon. A mold insert is inserted within an aperture by aligning the tabs with the spaces between the protrusions and moving the mold insert axially therein. Then, by rotating the mold insert relative to the mold plate, the tabs are moved over the protrusions. As a result, the mold insert is retained within the aperture. Locking bars prevent rotation of the mold inserts at undesired times to prevent them from being removed from the mold plate. A locking mechanism may be used to secure the locking bars, and therefore the mold inserts, in their locked positions during use.

22 Claims, 6 Drawing Sheets

QUICK CHANGE HOLDER FOR MOLD INSERTS

BACKGROUND OF THE INVENTION

This invention relates in general to mold and die supporting mechanisms and in particular to a quick change holder for releasably supporting a plurality of rubber oil seal mold inserts in a power press machine.

Annular rubber oil seals are presently manufactured by compression molding a quantity of uncured rubber material between upper and lower cooperating mold halves, referred to as mold inserts. Initially, the upper mold insert is secured to the movable ram of a conventional power press machine, while the lower mold insert is secured to the bolster thereof. Both of the mold inserts are heated to a predetermined temperature, for a purpose which will be explained below. To form the oil seal, the uncured rubber material is disposed between the upper and lower mold inserts. The ram is then lowered toward the bolster such that the upper mold insert is moved adjacent to the lower mold insert, thereby compressing he rubber material therebetween. The mold inserts are shaped such that the rubber material takes a desired configuration for the oil seal when compressed. The combined heat and pressure exerted by the mold inserts against the rubber material causes it to cure after a period of time. After the rubber material has hardened, the ram and the upper mold insert are raised, thereby permitting the newly formed oil seal to be removed. A conventional stripper plate may be used to assist in removing the seal from the mold inserts.

In order to increase the efficiency of the above described process, it is known to mount a plurality of upper and lower mold inserts within the power press machine such that a plurality of oil seals are simultaneously formed on each stroke of the ram. To accomplish this, upper and lower mold plates are provided to secure the pluralities of upper and lower mold inserts respectively to the ram and the bolster of the power press machine. The upper mold plate is formed from a generally flat piece of metal having a plurality of apertures formed therethrough, one for each of the upper mold inserts to be retained therein. A counterbore is formed about each of the apertures in the upper surface of the upper mold plate so as to define a recessed, reduced diameter annular shoulder within each aperture.

Each of the mold inserts is generally cylindrical in shape, having an enlarged diameter annular collar formed circumferentially about the upper end thereof. The upper mold inserts are installed in the upper mold plate by lowering them through the upper surface into the apertures until the collars engage the shoulders in the counterbores. The upper mold plate, carrying all of the upper mold inserts which have been inserted in this manner, is then attached to the ram of the power press machine by any conventional means. The lower mold plate and the lower mold inserts are installed in a similar fashion, except that the counterbores in the lower mold plate are formed in the lower surface thereof and the lower mold insert collars are formed about the lower ends thereof.

Although this structure has increased the overall efficiency of he oil seal formation process, it has also been found to be somewhat cumbersome when it is desired to remove some or all of the mold inserts from the power press machine. Such removal may be necessary to replace all of the installed mold inserts with differently shaped mold inserts to permit the formation of oil seals having a different configuration. Alternatively, it may be necessary to remove only a single pair of the inserts for cleaning, while the other pairs continue to be used. In any event, the structure described above does not lend itself to readily removing any the mold inserts from the mold plates. Such removal requires the detachment of, for example, the upper mold plate from the ram so that the upper mold inserts can be removed by raising them upwardly out of the apertures. This can be a time consuming and awkward process, especially if the mold inserts are large and heavy. Indeed, in some instances, a motorized lift vehicle is required to support the very heavy mold plates during this removal process. Additionally, once the desired mold inserts are removed, the mold plates have to be precisely re-positioned within the power press machine before re-attachment. This repetition of the positioning process for each removal of the mold inserts causes further delay and inconvenience.

SUMMARY OF THE INVENTION

This invention relates to an improved structure for securing a plurality of mold inserts to a power press machine which permits the simple and efficient insertion and removal thereof. An upper mold plate is secured to the power press machine in a conventional manner. A plurality of apertures are formed through the upper mold plate, each defining an inner diameter. Within each aperture, a plurality of radially inwardly extending protrusions are provided. The protrusions are generally shaped in the form of annular segments and define spaces therebetween. The inner surfaces of the protrusions define a diameter which is smaller than the diameter of the aperture. The mold inserts are generally cylindrical in shape, having an outer diameter which is slightly smaller than the inner diameter defined by the protrusions. The mold inserts include end portions having a plurality of radially outwardly extending tabs formed integrally therewith. The outer surfaces of the tabs define a diameter which is slightly smaller than the inner diameter of the aperture. A mold insert is inserted within an aperture by aligning the tabs with the spaces between the protrusions and moving the mold insert axially therein. Then, by rotating the mold insert relative to the mold plate, the tabs are moved over the protrusions. As a result, the mold insert is retained within the aperture. One or more locking bars may be provided to prevent rotation of the mold inserts at undesired times to prevent them from being inadvertently removed from the mold plates. A locking mechanism may further be provided to secure the locking bars, and therefore the mold inserts, in their locked positions during use.

It is an object of the present invention to provide an improved structure for securing a plurality of mold inserts to a power press machine.

It is another object of the present invention to provide such a structure which permits the efficient insertion and removal of such mold inserts without the use of external tools.

It is a further object of the present invention to provide such a structure which is simple and inexpensive in construction and operation.

Other objects and advantages of the present invention will become apparent to those skilled in the art from the following detailed description of the preferred embodiment, when read in light of the accompanying drawings.

DETAILED DESCRIPTION OF THE PREFERRED EMBODIMENT

Figure 1:
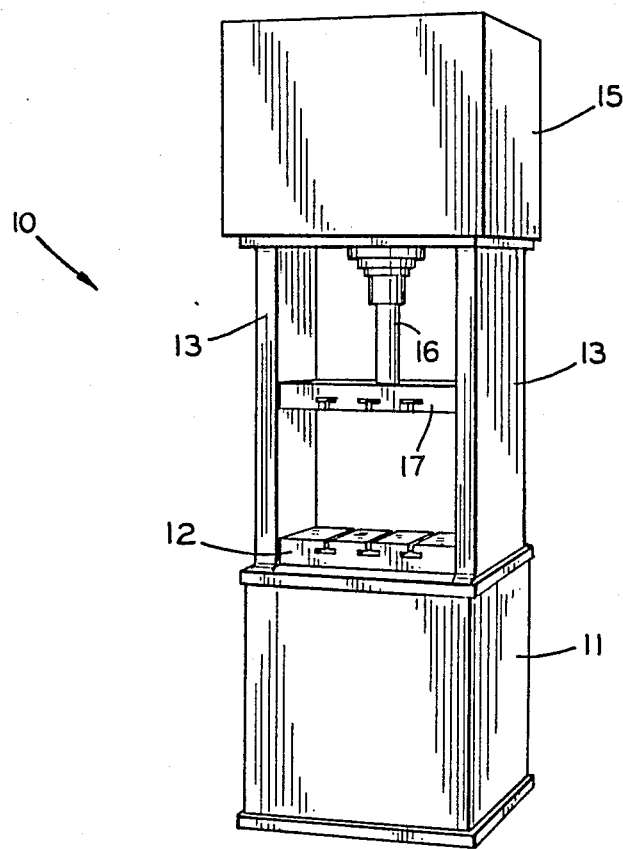
FIG. 1 is a simplified perspective view of a power press machine used to form rubber oil seals in accordance with the present invention.

Referring now to the drawings, there is schematically illustrated in FIG. 1 a conventional power press machine, indicated generally at 10, used to form rubber oil seals in accordance with the present invention. The power press machine 10 includes a bed or base 11 having a bolster 12 secured to the upper end thereof. A pair of uprights 13 extend upwardly from the bed 11 on opposite sides of the power press machine 10. A crown 15 extends between the upper ends of the uprights 13. A slide 16 is carried by the crown 15 and is vertically movable relative thereto. A motor (not shown) is disposed within the crown 15 for selectively effecting such vertical movement of the slide 16. A ram 17 is secured to the lower end of the slide 16 and is movable therewith. The bolster 12 and the ram 17 have well known T-shaped slots or other conventional mounting means formed thereon for purposes which will be explained below.

Figure 2:
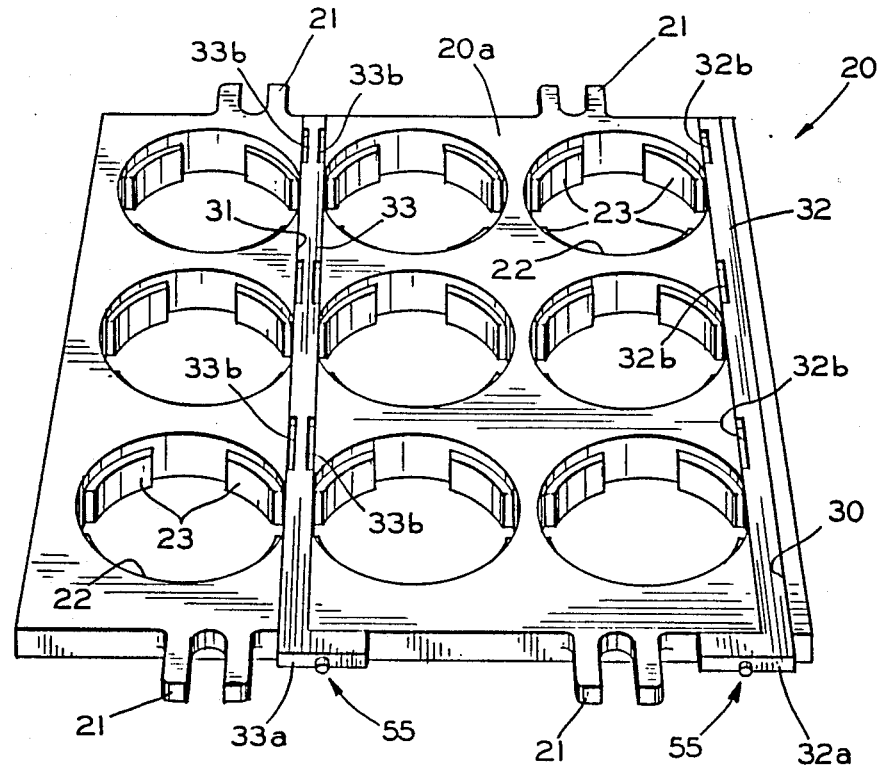
FIG. 2 is a perspective view of an upper mold plate adapted for use with the power press machine illustrated in FIG. 1.

In FIG. 2, a flat metallic upper mold plate, indicated generally at 20, having an upper surface 20a is illustrated. The upper mold plate 20 is adapted for use with the power press machine 10 illustrated in FIG. 1. The upper mold plate 20 includes a plurality of mounting ears 21 extending outwardly therefrom. The mounting ears 21 are shaped in a conventional manner to facilitate the attachment of the upper mold late 20 to the ram 17 by conventional means (not shown) cooperating with the T-shaped slots in a known manner. When so attached, the upper surface 20a of the upper old plate 20 is disposed flat against the lower surface of the ram 17 (i.e., the surface of the ram 17 into which the bases of the T-shaped slots open). As will be explained in detail below, once the upper mold plate 20 is attached to the ram 17 in a proper position within the power press machine 10, it does not need to be removed therefrom during use.

Figure 6:
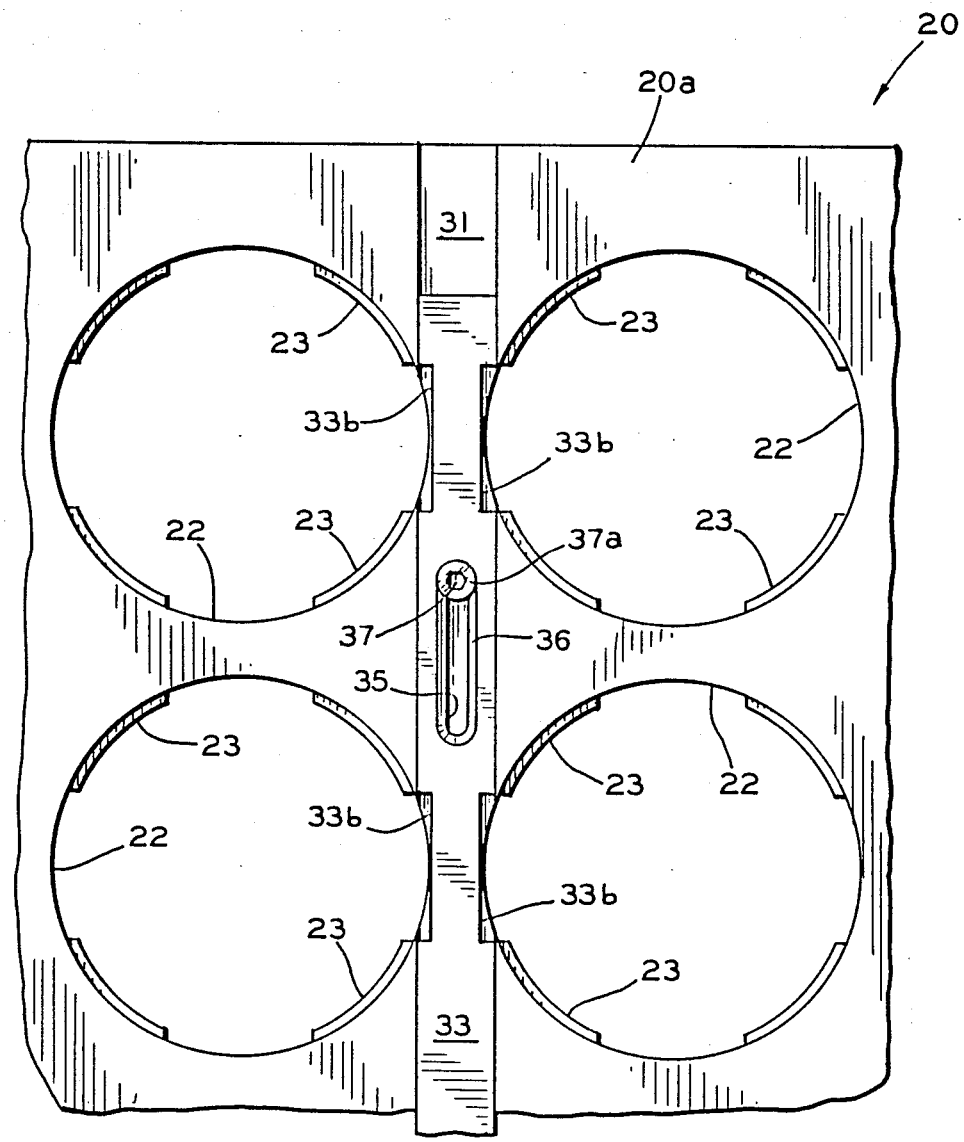
FIG. 6 is a fragmentary top plan view of the upper mold plate illustrated in FIG. 2 showing the locking bar in an unlocked position.

A plurality of apertures 22 are formed through the upper mold plate 20. Although nine of such apertures 22 are illustrated, any desired number may be provided. Each aperture 22 defines an inner diameter thereacross. However, as best shown in FIG. 6, a plurality of annular segment shaped protrusions 23 are formed within each of the apertures 22. In the illustrated embodiment, four of such protrusions 23 are formed in each of the apertures 22, the protrusions 23 being separated by four spaces. All of the protrusions 23 and spaces are preferably formed of equal angular size. In other words, each of the protrusions 23 in the illustrated embodiment defines a forty-five degree arc with respect to the center of the aperture 22, and adjacent protrusions 23 are spaced apart from one another by a space which also defines a forty-five degree arc. However, the number and sizes of both the protrusions 23 and the spaces therebetween may be varied. The inner surfaces of the radially inwardly extending protrusions 23 define a diameter which is smaller than the diameter defined by the apertures 21.

Figure 3:
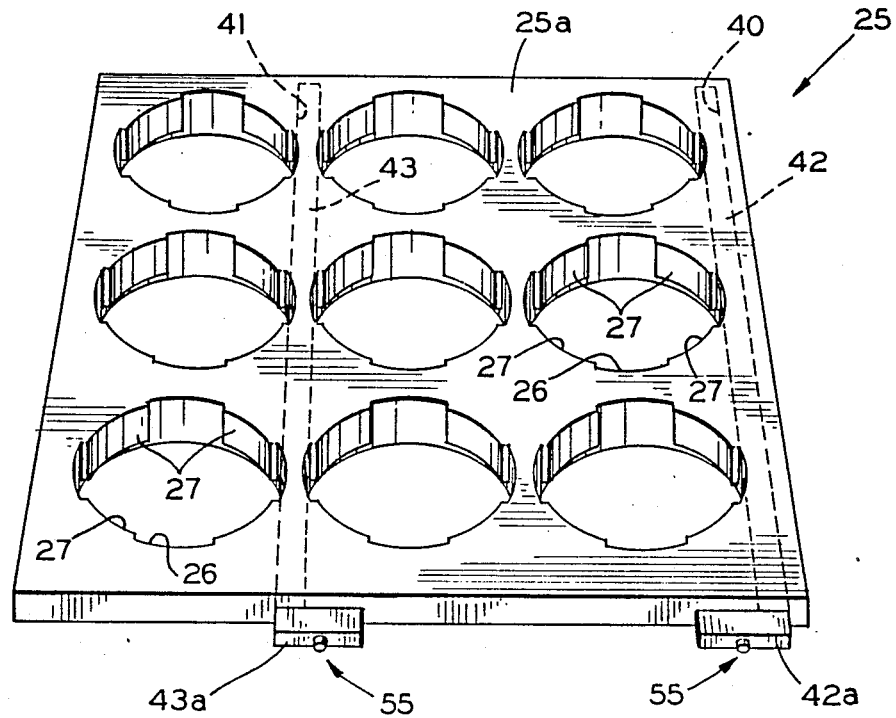
FIG. 3 is a perspective view of a lower mold plate adapted for use with the power press machine illustrated in FIG. 1.

In FIG. 3, a lower mold plate, indicate generally at 25, having an upper surface 25a is illustrated. The lower mold plate 25 is also adaptable for use with the power press machine 10 illustrated in FIG. 1, being attached to the bolster 12 by conventional means (not shown) cooperating with the inverted T-shaped slots in a known manner. When so attached, the lower surface (not shown) of the lower mold plate 25 is disposed flat against the upper surface of the bolster 12 (i.e., the surface of the bolster 12 into which the bases of the inverted T-shaped slots open). As will be explained n detail below, once the lower mold plate 25 is attached to the bolster 12 in a proper position within the power press machine 10, it does not need to be removed therefrom during use.

A plurality of apertures 26 is formed through the lower mold plate 25. The number and sizes of such apertures 26 correspond to the number and sizes of the apertures 22 formed in the upper mold plate 20. Similarly, a plurality of annular segment-shaped protrusions 27 are formed within each of the apertures 26, the number and sizes of which also correspond to the protrusions 23 formed on the upper mold plate 20. Thus, the inner surfaces of the radially inwardly extending protrusions 27 define a diameter which is smaller than the diameter defined by the aperture 26.

As best shown in FIG. 2, the upper surfaces of the protrusions 22 formed on the upper mold plate 20 are recessed below the upper surface 20a thereof, while the lower surfaces thereof (not shown) are formed flush with the lower surface (not shown) of the upper mold plate 20. The protrusions 23 can be formed on the upper mold plate 20 in this manner by initially forming each aperture 22 as having a diameter which is equal to the smaller diameter defined by the inner surfaces of the protrusions 23. Then, each aperture 22 is counterbored downwardly from the upper surface 20a of the upper mold plate 20 so as to form an annular shoulder therein. The counterbores define diameters which are equal to the larger diameters defined by the apertures 22 mentioned above, while the shoulders continue to define the smaller diameters. Lastly, portions of the annular shoulder are removed by any conventional metal removing technique, such as by milling, to form the annular segment-shaped protrusions 23 separated by the spaces.

Conversely, the upper surfaces of the protrusions 27 formed on the lower mold plate 25 are formed flush with the upper surface 25a of the lower mold plate 25, while the lower surfaces thereof (not shown) are recessed above the lower surface (not shown) of the upper mold plate 20. The protrusions 27 may be formed in a similar manner to that used to form the protrusions 22 described above.

Referring now to FIGS. 2, 6, 7, and 8, a pair of grooves 30 and 31 are formed in the upper surface 20a of the upper mold plate 20. The first groove 30 extends linearly from front to back on the upper mold plate 20 so as to intersect three of the apertures 22 in a chord-like fashion. The second groove 31 also extends linearly from front to back on the upper mold plate 20, but intersects six of the apertures 22 in a chord-like fashion, three on each side thereof. As best shown in FIG. 6, the protrusions 23 are oriented such that they do not extend into the portions of the apertures 22 intersected by the grooves 30 and 31. In other words, the chord defined by the intersection of the second groove 31 with the apertures 22 extends completely within one of the spaces defined between adjacent protrusions 23. The protrusions 22 of the apertures 21 which are intersected by the first groove 30 are similarly formed.

Locking bar 32 and 33 are respectively disposed within the grooves 30 and 31. The first locking bar 32 extends throughout the first groove 30 and includes an angled handle portion 32a at the front of the upper mold plate 20. A notch 32b is formed in one side of the first locking bar 32 for each of the apertures 22 (three in the illustrated embodiment) intersected by the first groove 32. The purpose of these notches 32b will be explained in detail below. The second locking bar 33 is formed in a similar manner, except that six notches 33b are formed therein for the six apertures 21 intersected by the second groove 31.

Each of the locking bars 32 and 33 has a pair of elongated slots 35 formed therethrough. Within each of the slots 35, a recessed counterbored shoulder 36 is formed. A smaller diameter shank portion (not shown) of a shoulder bolt 37 extends through the each of the slots 35 into engagement with the upper mold plate 20. A larger diameter head portion 37a of the shoulder bolt 37 is disposed adjacent to the upper surface of the counterbored shoulder 36 within the recessed area. The slots 35 and the shoulder bolts 37 are provided to retain the locking bars 32 and 33 within the grooves 30 and 31, while permitting sliding movement thereof relative to the upper mold plate 20. The length of such sliding movement is limited by the length of the slots 35 such that the locking bars 32 and 33 may be moved between a locked position, illustrated in FIGS. 2 and 8, and an unlocked position, illustrated in FIGS. 6 and 7.

On the lower mold plate 25, a pair of grooves 40 and 41 (illustrated in dotted lines in FIG. 3) are formed in the lower surface thereof. The grooves 40 and 41 are formed similar to the grooves 30 and 31 with respect to the apertures 35 and the protrusions 36 formed on the lower mold plate 25. Additionally, a pair of locking bars 42 and 43 (also illustrated in dotted lines in FIG. 3) are disposed within the grooves 40 and 41. The locking bars 42 and 43 include respective handle portions 42a and 43a and notches (not shown), similar to the locking bars 32 and 33. The locking bars 42 and 43 are retained within the grooves 40 and 41 by slots having counterbored shoulders and cooperating shoulder bolts (neither shown), similar to those described above, for permitting sliding movement of the locking bars 42 and 43 relative to the lower mold plate 25.

Figure 4:
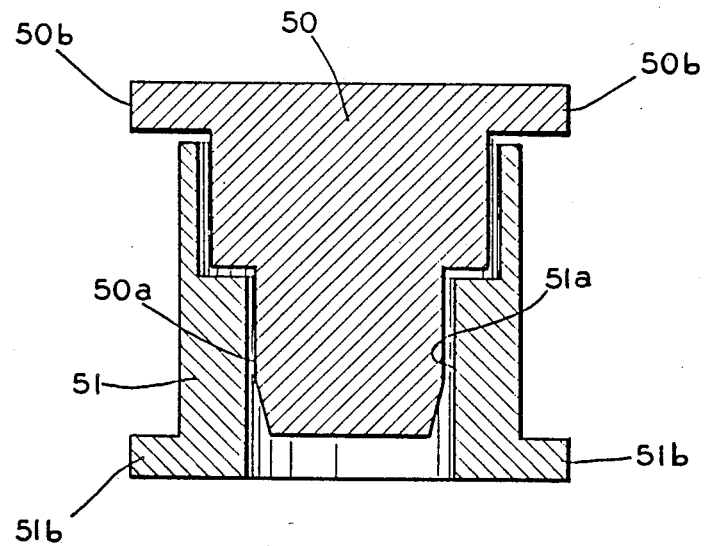
FIG. 4 is a sectional elevation view of a pair of mold inserts adapted for use with the upper and lower mold plates illustrated in FIGS. 2 and 3.
Figure 5:
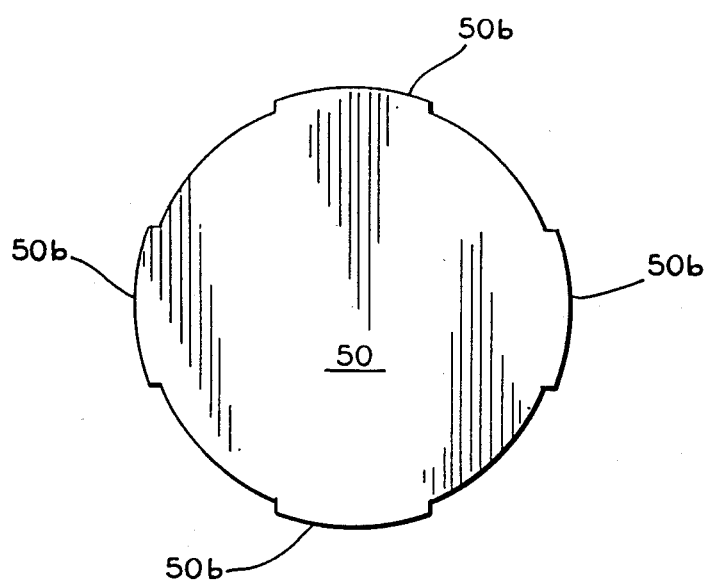
FIG. 5 is a top plan view of the upper mold insert illustrated in FIG. 4.

Referring now to FIGS. 4 and 5, a pair of mold inserts 50 and 51 are illustrated. The upper mold insert 50 is adapted for use with the upper mold plate 20, while the lower mold insert 51 is adapted for use with the lower mold plate 25. The body portions of both the upper and lower mold inserts 50 and 51 are generally cylindrical in shape, defining outer diameters which are slightly smaller than the inner diameter defined by the protrusion 23 and 27 formed on the upper and lower mold plates 20 and 25, respectively. The upper mold insert 50 has a central lower surface portion 50a which extends within a central upper surface portion 51a of the lower mold insert 51. The configurations of these surface portions 50a and 51a define the shape of the oil seal to be formed and, therefore, can take any desired shape, as s known in the art. In FIG. 4, the illustrated shapes of the surface portions 50a and 51a have been greatly simplified, inasmuch as they form no part of the invention.

The upper end of the upper mold insert 50 and the lower end of the lower mold insert 51 are each formed having a plurality of radially outwardly extending segment shaped tabs 50b and 51b. The outer surfaces of the tabs 50b and 51b define diameters which are slightly smaller than the inner diameters defined by the apertures 22 and 26 formed through the upper and lower mold plates 20 and 25, respectively. However, such diameters are larger than the inner diameters defined by the protrusions 23 and 27. The tabs 50b and 51b are used to selectively connect the upper and lower mold inserts 50 and 51 respectively to the upper and lower mold plates 20 and 25, in a manner which will be described in detail below.

However, before the mold inserts 50 and 51 can be connected to the upper and lower mold plates 20 and 25, respectively, the locking bars 32 and 33 connected to the upper mold plate 20 and the locking bars 42 and 43 connected to the lower mold plate 25 must be moved to their unlocked positions. The locking bar 33 illustrated in FIG. 6 is shown in the unlocked position. Such unlocked position is characterized by the alignment of the notches 33b with the apertures 22. Preferably, the slots 35 formed through the locking bar 33 are formed such that the shoulder bolt 37 provide a positive stop for moving the slidable locking bar 33 to the unlocked position, as shown.

Figure 7:
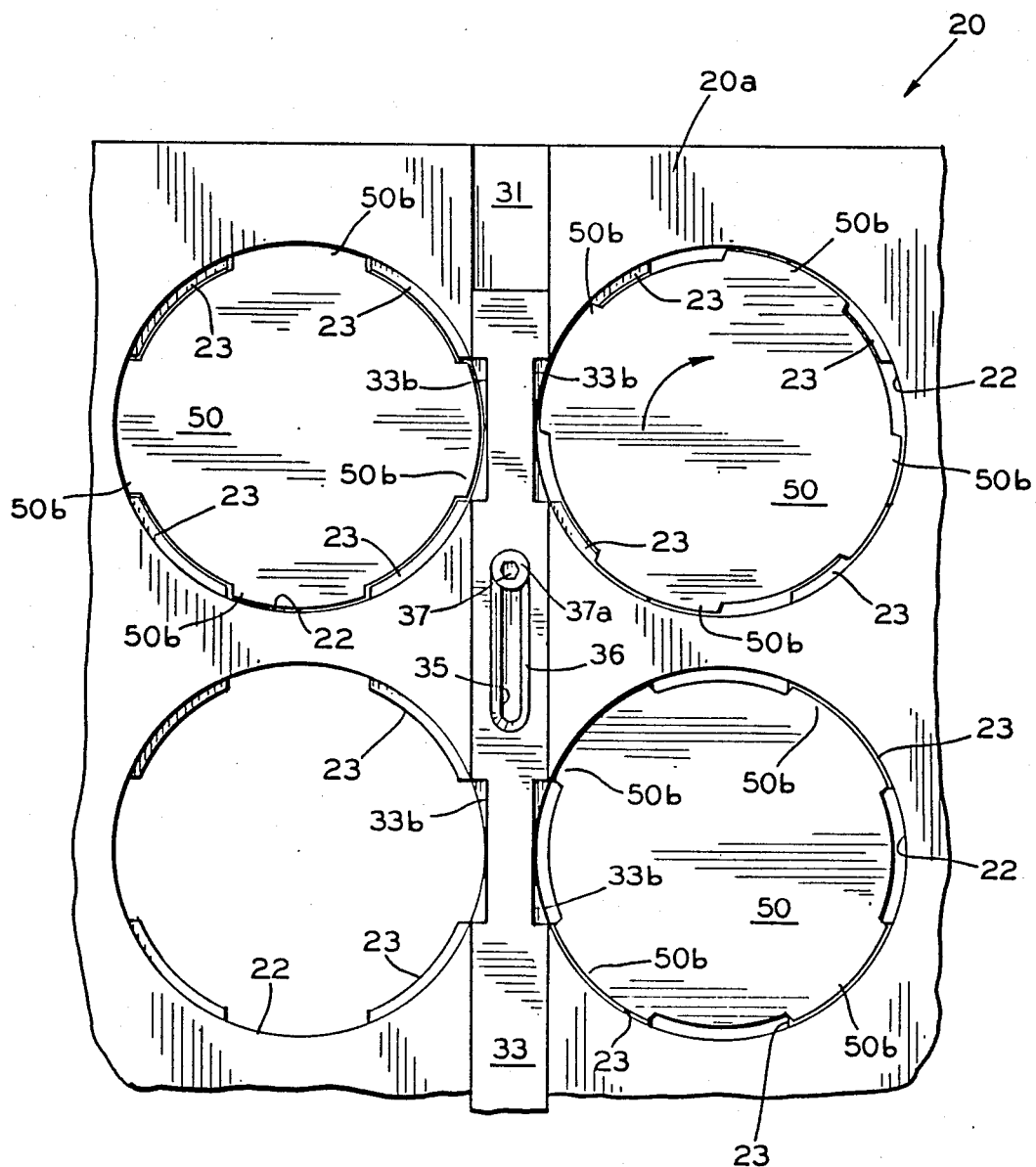
FIG. 7 is a fragmentary top plan view similar to FIG. 6 showing the upper mold inserts being inserted within the apertures of the upper mold plate at various stages.
Figure 8:
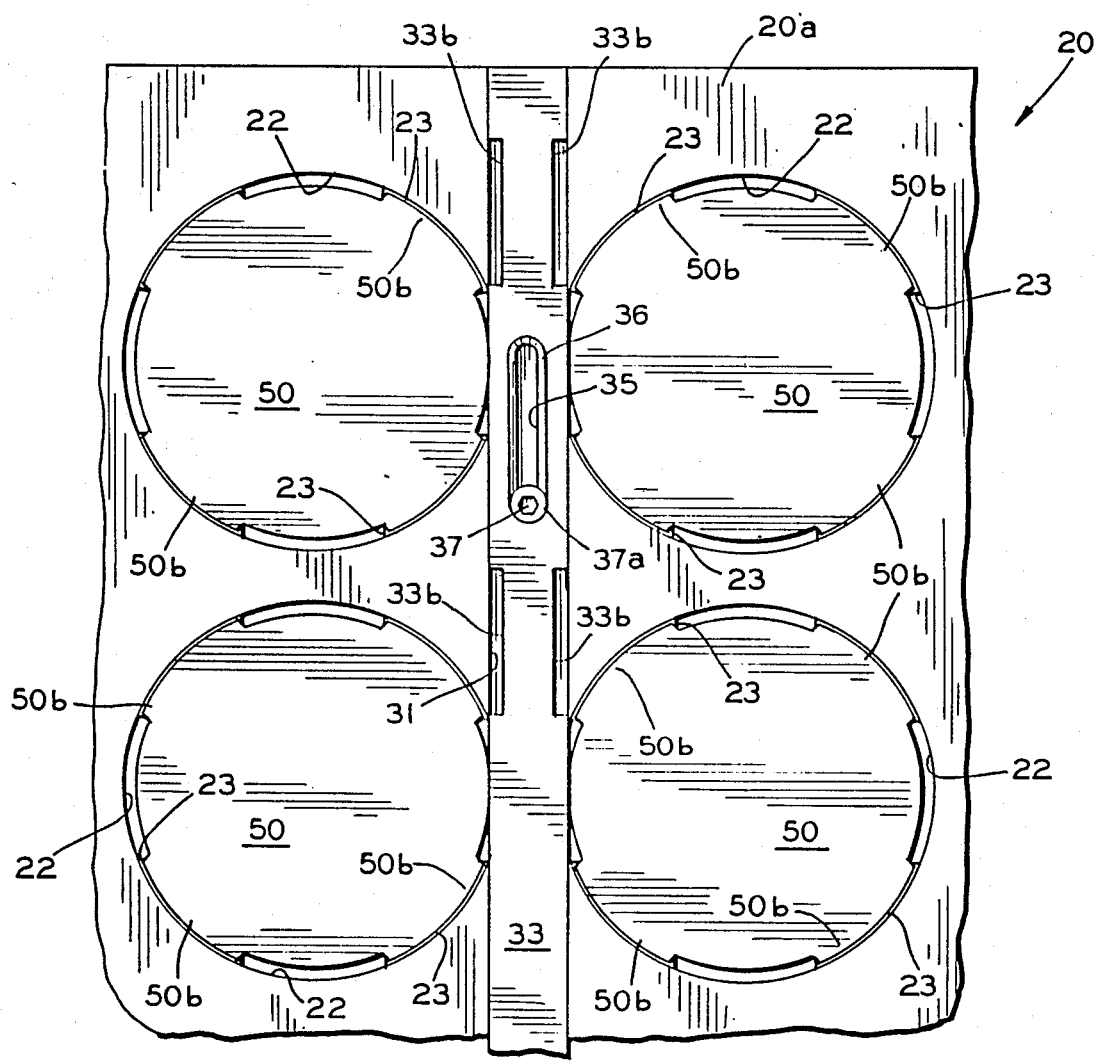
FIG. 8 is a fragmentary top plan view similar to FIG. 7 showing the locking bar in a locked position.

Referring now to FIG. 7, which is a top plan view of the upper mold plate 20, the manner in which the upper mold inserts 50 are connected to the upper mold plate 20 is shown in detail. As shown therein in the upper left hand corner, the upper end of the upper mold insert 50 is initially oriented co-axially below the aperture 22 such that the tabs 50b are positioned in the spaces between the protrusions 23. When so positioned,, the upper mold insert 50 is raised axially upwardly so as to be received within the aperture 22, whereby the tabs 50b are moved past the protrusions 23. Then, as shown in the upper right hand corner of FIG. 7, the upper mold insert 50 is rotated relative to the upper mold plate 20. Such rotation causes the tabs 50b of the upper mold insert 50 to be moved above the protrusions 23. When the tabs 50b are generally disposed above the protrusions 23 and the spaces between the tabs 50b are aligned with the spaces between the protrusions 23, as shown in the lower right hand corner of FIG. 7, rotation of the upper mold insert 50 is stopped.

Thus, as shown in the lower right hand corner of FIG. 7, the upper mold insert 50 is supported on the upper mold plate 20 by the engagement of the tabs 50b with the protrusions 23. The other upper mold inserts 50 are installed and supported on the upper mold plate 20 in a similar manner. Since the upper mold plate 20 is connected to the ram 17, the upper mold inserts 50 cannot be removed therefrom by further upward movement. The lower mold inserts 51 are connected to he lower mold plate 25 in a similar fashion, except that they are lowered through the apertures 26 before being rotated. Since the lower mold plate 25 is connected to the bolster 12, the lower mold inserts 51 cannot be removed by further downward movement. Accordingly, the mold inserts 50 and 51 are connected to the upper and lower mold plates 20 and 25, respectively, for use.

Preferably, means are provided for selectively preventing the upper and lower mold inserts 50 and 51 from rotating relative to the respective upper and lower mold plates 20 and 25 and, therefore, from being removed therefrom. To this end, the upper mold inserts 50 are locked in these positions by moving the locking bar 33 from the unlocked position illustrated in FIG. 7 to the locked position illustrated in FIG. 8. Such locked position is characterized by the non-alignment of the notches 33b with the apertures 22. The slots 35 formed through the locking bar 33 may be formed such that the shoulder bolt 37 provides a positive stop for moving the slidable locking bar 33 to the locked position, as shown. Alternatively, the handle portion 30a of the locking bar 30 may abut the edge of the upper mold plate 20 to provide such a positive stop. Similarly, the other locking bars 31, 42, and 43 are moved to their locked positions.

When the locking bars 32, 33, 42, and 43 are in their locked positions, the upper and lower mold inserts 50 and 51 are prevented from being removed from the upper and lower mold plates 20 and 25, respectively. This occurs because the notches formed on the locking bars 32, 33, 42, and 43 have been moved away from the apertures 21 and 26, such that the sides of the locking bars 32, 33, 42, and 43 extend into the spaces between adjacent pairs of the tabs 50b and 51b. Consequently, any attempt to rotate the upper or lower mold inserts 50 or 51 will cause the tabs 50b and 51b to abut the sides of the locking bars 32, 33, 42, and 43. As a result, rotation is prevented, and the upper and lower mold inserts 50 and 51 are locked in position relative to the upper and lower mold plates 20 and 25.

Figure 9:
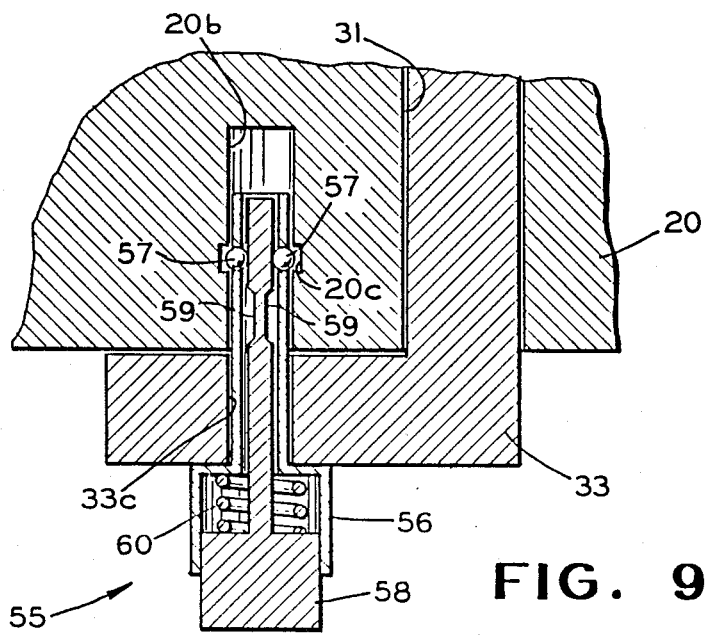
FIG. 9 is a fragmentary sectional top plan view of the upper mold plate and the locking bar showing a quick release locking mechanism used for selectively retaining the locking bar in a locked position.

If desired, a locking mechanism, indicated generally at 55, may be provided for retaining each of the locking bars 32, 33, 42, and 43 in their locked positions. As shown in FIG. 9, the locking mechanism 55 can include a quick release pin 56 extending through an aperture 33c formed in the handle portion 33a of the locking bar 33 into a bore 20b formed in the upper mold plate 20. An annular recess 20c is formed within the bore 20b. The pin 56 can be conventional in the art, including a pair of small opposed balls 57 urged apart from one another by a plunger 58 so as to be receive within the recess 20c. When installed, the pin 55 prevents the locking bar 33 from being moved out of the locked position. The plunger 58 is manually movable from the illustrated locked position to an unlocked position by pushing it inwardly within the pin 56. As a result, the balls 57 move into an annular recess 59 formed on the plunger 58 and out of the recess 20c, thereby permitting removal of the pin 55 from the upper mold plate 20 and the locking bar 33. Once the pin 55 has been removed, the locking bar 33 can be moved to the unlocked position. A spring 60 is provided to urge the plunger 58 toward the locked position.

It will be appreciated that the structure of this invention permits one or more of the old inserts 50 or 51 to be quickly and easily replaced. Such removal is accomplished by initially sliding one of the locking bars, the locking bar 33 for example, from the locked position to the unlocked position. The selected upper mold insert 50 can then be rotated relative to the upper mold plate 20 until the tabs 50b are aligned with the spaces between the protrusions 23, as shown in the upper left hand corner of FIG. 7. Then, the upper mold insert 50 simply drops out of the aperture 22, and a new insert can be inserted therein. Alternatively, it may be desired simply to leave the aperture 22 empty for a period of time. In any event, the removal and replacement of the mold inserts 50 and 51 can be performed without removing the upper and lower mold plates 20 and 25 from the power press machine 10, which would otherwise greatly complicate the process. As mentioned above, such removal of the mold plates 20 and 25 requires a time-consuming re-positioning process to be performed when they are re-attached to the power press machine 10. An additional advantage of this invention is that no external tools are required to remove and replace the mold inserts 50 and 51, which results in additional time and cost savings.

Preferably, the upper and lower mold plates 20 and 25 are used in conjunction with a conventional stripper plate (not shown) for assisting in the removal of the oil seals after they have been formed. The stripper plate forms no part of this invention.

In accordance with the provisions of the patent statutes, the principle and mode of operation of this invention have been explained and illustrated in its preferred embodiment. However, it will be appreciated that the invention can be practiced otherwise than as specifically explained and illustrated without departing from its spirit or scope. For example, although this invention has been described and illustrated in terms of the top driven power press machine 10 configured as a compression molding apparatus, it will be appreciated that the invention can be used in other molding applications, such as injection molding and the like.

What is claimed is:

1. A mold assembly comprising:
   a mold plate having an aperture formed therethrough, said aperture defining an inner diameter, said mold plate further including a plurality of protrusions extending into said aperture, said protrusions defining an inner diameter which is smaller than said inner diameter defined by said aperture, spaces being defined between adjacent ones of said protrusions, said mold plate further including a groove formed therein extending into one of said spaces in a chord-like fashion;
   a mold insert defining an outer diameter which is smaller than said inner diameter defined by said protrusions, said mold insert further including a plurality of tabs extending outwardly therefrom, said tabs defining an outer diameter which is larger than said inner diameter defined by said protrusions and smaller than said inner diameter defined by said aperture, said mold insert being disposed within said aperture and rotatably therein between a first position, wherein said tabs are aligned with said protrusions to retain said mold insert within said aperture, and a second position, wherein said tabs are not aligned with said protrusions to permit removal said mold insert from said aperture; and locking bar means disposed in said groove and movable between a locking position, wherein said locking bar means prevents said mold insert from moving into the second position, and an unlocking position, wherein said locking bar means permits said mold insert to move into said second position.

2. The invention defined in claim 1 wherein said protrusions are formed in a shape of annular segments.

3. The invention defined in claim 1 wherein all of said protrusions are of equal size.

4. The invention defined in claim 3 wherein all of said spaces are of equal size.

5. The invention defined in claim 1 wherein said mold plate has a surface through which said aperture is formed and said groove is formed in said surface.

6. The invention defined in claim 5 wherein said protrusions are recessed below said surface of said mold plate.

7. The invention defined in claim 1 wherein said locking bar means includes a locking bar disposed in said groove and slidably movable between said locking and unlocking positions, one side of said locking bar extending into said space when said locking bar is in said locking position to prevent said mold insert from moving to the second position by blocking one of said tabs to prevent it from being aligned with said space.

8. The invention defined in claim 7 wherein said locking bar has a notch formed in said side, said notch being disposed adjacent to said space when said locking bar is in said unlocking position to permit said mold insert to move to the second position.

9. The invention defined in claim 1 wherein a plurality of said apertures are formed through said mold plate, each of said apertures having respective pluralities of protrusions extending therein and having respective spaces defined between adjacent ones of said protrusions.

10. The invention defined in claim 9 wherein a plurality of said mold inserts is respectively provided in said plurality of apertures, each of said mold inserts including a plurality of said tabs.

11. The invention defined in claim 10 wherein said groove extends through one of said spaces defined in each of said apertures in a chord-like fashion relative thereto.

12. The invention defined in claim 11 wherein said locking bar means is movable between a multiple locking position, wherein it prevents each of said mold inserts from moving into the second position, and a multiple locking position, wherein it permits each of said mold inserts to move into said second position.

13. The invention defined in claim 12 wherein said mold plate has a surface through which each of said apertures is formed and said groove is formed in said surface.

14. The invention defined in claim 13 wherein all of said protrusions are recessed below said surface of said mold plate.

15. The invention defined in claim 12 wherein said locking bar means includes a locking bar disposed in said groove and slidably movable between said multiple locking and multiple locking positions, one side of said locking bar extending into one of said spaces of all of said apertures when said locking bar is in said multiple locking position to prevent all of said mold inserts from moving to their second positions by blocking respective ones of said tabs to prevent them from being aligned with said respective spaces.

16. The invention defined in claim 15 wherein said locking bar has a plurality of notches formed in said side, said notches being disposed adjacent to said spaces when said locking bar is in said multiple unlocking position to permit all of said mold inserts to move to their second positions.

17. The invention defined in claim 12 wherein said locking bar means includes a locking bar disposed in said groove and slidably movable between said multiple locking and second multiple unlocking positions, a first side of said locking bar extending into one of said spaces of some of said apertures when said locking bar is in said multiple locking position to prevent said mold inserts from moving to their second positions by blocking respective ones of said tabs to prevent them from being aligned with said respective spaces, a second side of said locking bar extending into one of said spaces of the rest of said apertures when said locking bar is in said multiple locking position to prevent said mold inserts from moving to their second positions by blocking respective ones of said tabs to prevent them from being aligned with said respective spaces.

18. The invention defined in claim 17 wherein said locking bar has a plurality of notches formed in each of said first and second sides, said notches being disposed adjacent to said spaces when said locking bar is in said multiple unlocking position to permit all of said mold inserts to move to their second positions.

19. The invention defined in claim 1 further including means for limiting the movement of said locking bar means between said locking and unlocking positions.

20. The invention defined in claim 19 wherein said means for limiting includes a slot formed through said locking bar means and a bolt extending through said slot into engagement with said mold plate, said bolt engaging a first end of said slot when said locking bar means is in said locking position and engaging a second end of said slot when said locking bar means is in said unlocking position.

21. The invention defined in claim 1 further including means for retaining said locking bar means in one of said locking and unlocking positions.

22. The invention defined in claim 21 wherein said means for retaining includes a locking mechanism for selectively connecting a portion of said locking bar means to said mold plate to retain said locking bar means in said locking position.

* * * * *

UNITED STATES PATENT AND TRADEMARK OFFICE
CERTIFICATE OF CORRECTION

PATENT NO.  : 4,911,632

DATED       : March 27, 1990

INVENTOR(S) : James A. Mansfield

It is certified that error appears in the above-identified patent and that said Letters Patent is hereby corrected as shown below:

Col. 8, claim 1, line 68    Change "rotatably to --rotatable--.

Col. 9, claim 12, line 56   Change "locking" to --unlocking--.

Col. 10 claim 15, line 4,   After "multiple", change "locking" to --unlocking--.

Col. 10 claim 17, line 4,   Delete "second".

Signed and Sealed this

Fourth Day of June, 1991

Attest:

HARRY F. MANBECK, JR.

*Attesting Officer*   *Commissioner of Patents and Trademarks*